June 5, 1956 — B. N. LAFARGE — 2,748,974
CONTAINER CLOSURES
Filed Dec. 18, 1951 — 5 Sheets-Sheet 1

Inventor:
BERNARD NICOLAS LAFARGE
by J. Delattre-Seguy
Attorney

June 5, 1956
B. N. LAFARGE
2,748,974
CONTAINER CLOSURES
Filed Dec. 18, 1951
5 Sheets-Sheet 2
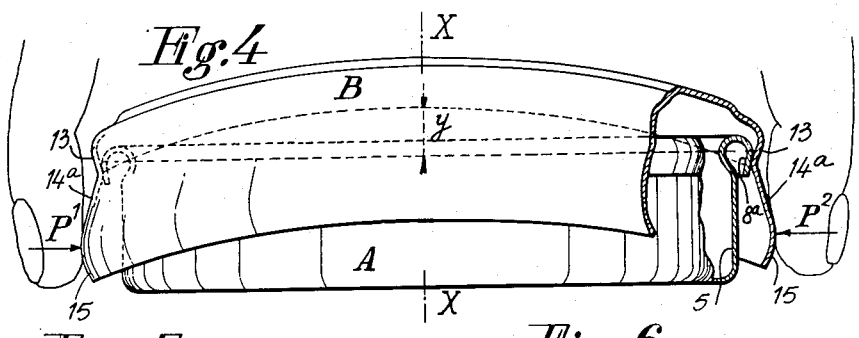
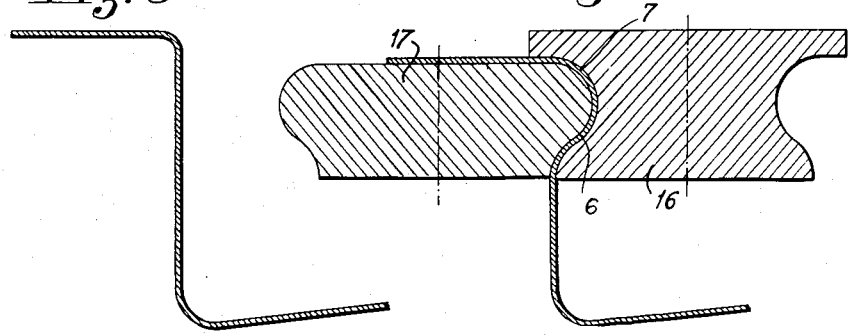
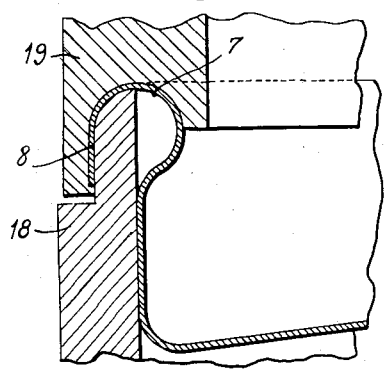
Inventor:
BERNARD NICOLAS LAFARGE
by: J Delattre-Seguy
Attorney

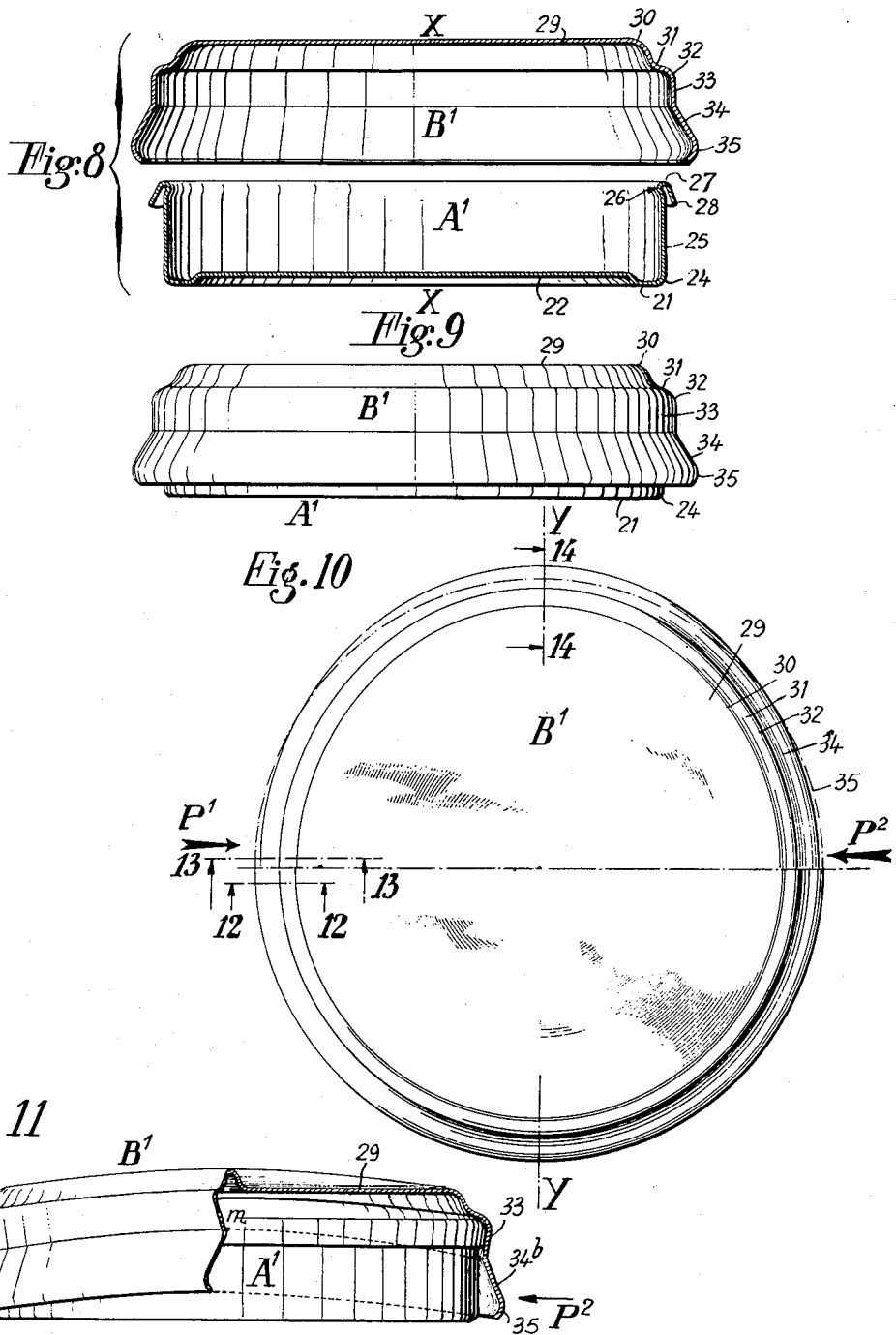

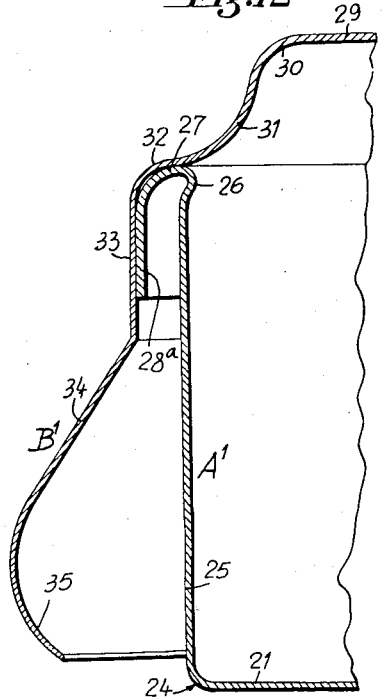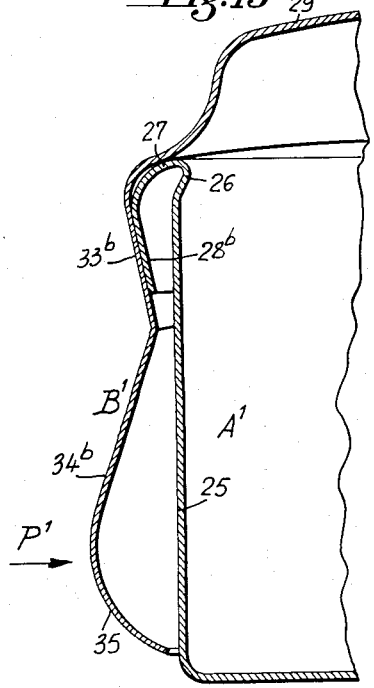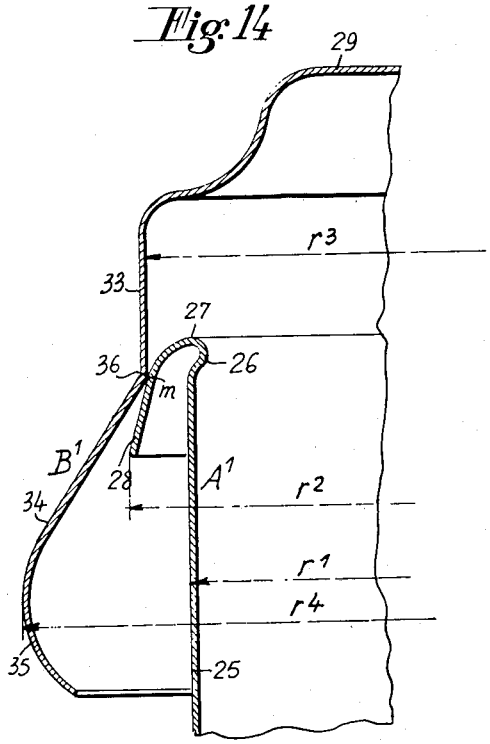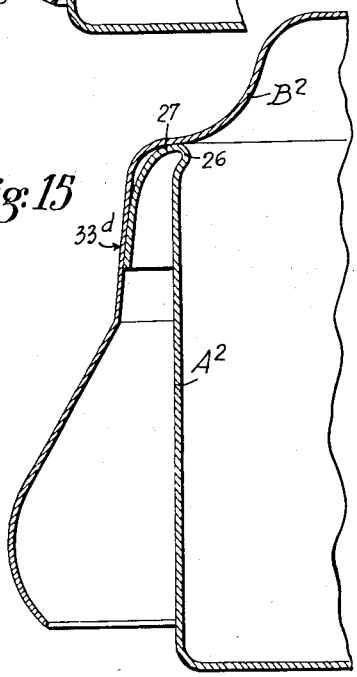

June 5, 1956  B. N. LAFARGE  2,748,974
CONTAINER CLOSURES
Filed Dec. 18, 1951  5 Sheets-Sheet 5
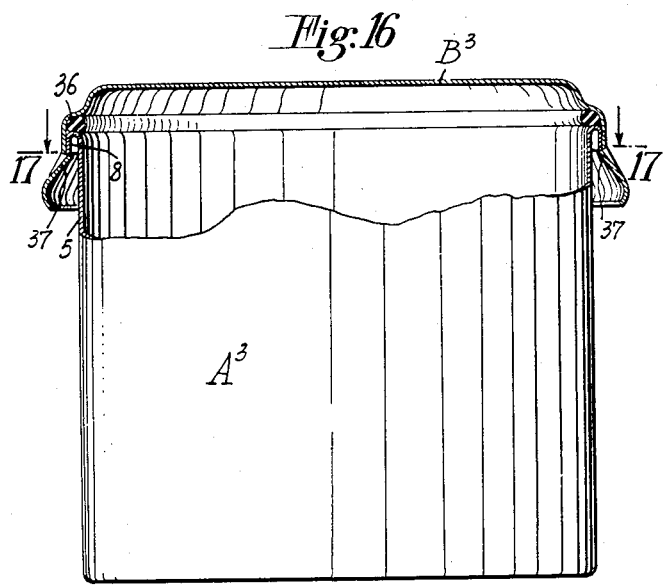
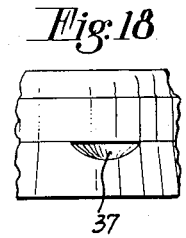
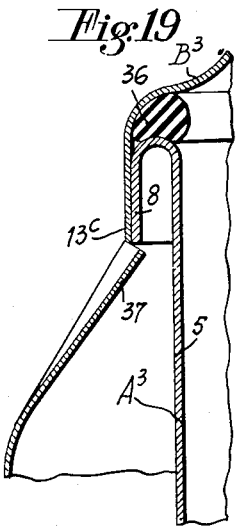
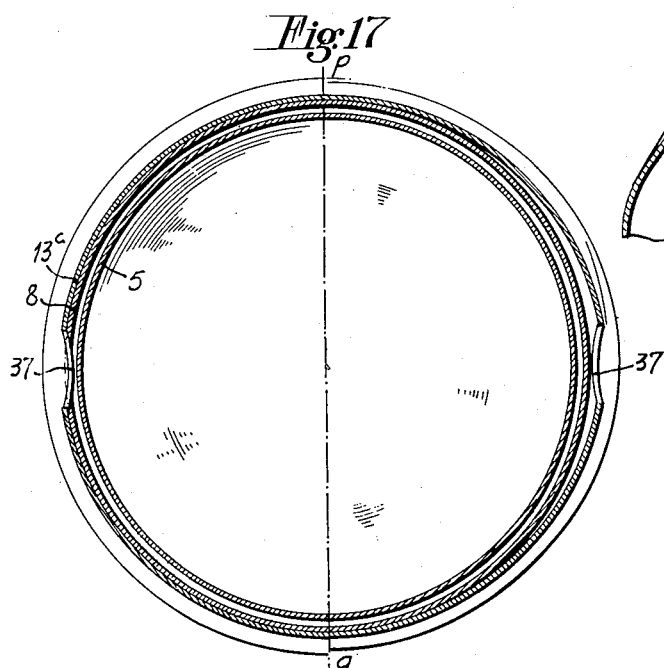
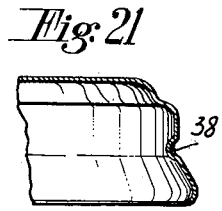
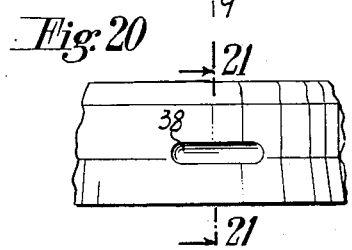
Inventor:
BERNARD николаs LAFARGE
by: J Delattre-Seguy
Attorney.

2,748,974

CONTAINER CLOSURES

Bernard Nicolas Lafarge, Sevres, France

Application December 18, 1951, Serial No. 262,203

Claims priority, application France December 22, 1950

5 Claims. (Cl. 220—43)

The present invention has for its object to provide a container constituted by a metallic body that may be in the form of a box (box for polish, cream and other like products, beauty products, etc.) flask, can, etc., and a lid, this body and this lid being improved so as to permit an easy fitting and removal of this lid by a lateral pressure on the latter at at least one set of two diametrically opposite points without the use of opening keys or other lid prying means.

Various combinations of this type have already been proposed but they all have, to a greater or lesser extent, one or the other of the following disadvantages:

1. The lid is too firmly held to the body of the container to permit its disengagement by hand by a bi-lateral pressure, this disadvantage being due in general to the fact that the proposed solutions in practice result in a rigid blocking of the lid on the body of the box and do not allow these parts enough elastic play.

2. There is insufficient connection between the lid and the body of the container and the lid slips off at the slightest lateral shock or does not resist the blow resulting from a fall of the container.

The invention by a very simple construction eliminates these disadvantages. The body of the container in accordance with the invention is provided with an upper edge that is turned outward in such a way as to form a depending wall so disposed at a certain distance from the outer face of the adjacent portion of said body that said depending wall is able to deform elastically, the lateral wall of the lid being formed, commencing at the periphery of the top wall, first by a cylindrical portion adapted to fit over said depending wall, then by an extension that is downwardly and outwardly flared in a conical or like shape so as to constitute a leverage arm and terminates in a rolled edge.

With the above described construction, when pressure is exerted on the lid at one or two sets of two diametrically opposite points on its downwardly flared extension, this extension which functions as an arm of a lever, constrains the cylindrical portion of the lateral wall of the lid to bear against the depending wall of the container body; the latter yields under the pressure, elastically deforms, and allows at the same time a large elastic deformation of the lateral wall and even of the top of the lid. Owing to this large deformation of the lid, the two regions of its cylindrical fitting or seating portion, situated at 90° from the points of application of the two lateral pressures, separate from the depending wall of the body to such an extent that, when the bi-lateral pressure ceases, the lid is practically disengaged from the body of the container.

Experience has shown that a simple bi-lateral pressure exerted by two fingers on the downwardly flared extension of the lid or at the most two bi-lateral pressures exerted successively in two directions perpendicular to one another, suffice in the case of a shoe polish box of normal size, to obtain the release of the lid.

This ease of release of the lid does not, however, imply its inopportune release through the action of a unilateral blow such as could be caused by the container falling. Many experiments carried out have shown in fact that the box in accordance with the invention resists, before opening, a number of shocks at least three times greater than the known types of boxes opened by the exertion of pressure on the lid.

As a further feature of this invention means are provided to prevent the opening of the box unless two successive bi-lateral pressures are exerted on the lid of the box along two diameters which are substantially perpendicular to each other.

Other features of the invention will be apparent from the ensuing description.

In the accompanying drawing given solely by way of example:

Fig. 4 is a view analogous to Fig. 1 after deformation of the lid by a bi-lateral pressure;

Figs. 5, 6 and 7 show, in radial section, three stages in the manufacture of the body of the box;

Fig. 8 is a diametral section of the two parts of a modification of the box in accordance with the invention, before assembly;

Fig. 9 is a view in elevation of the box shown in Fig. 8, when closed;

Fig. 10 is a plan view of the lid, shown in Fig. 8, the lower half showing the lid before deformation and the upper half after deformation;

Fig. 11 is a view in elevation with a partial section, after deformation of the lid shown in Fig. 8 by two diametrically opposite pressures;

Figs. 12, 13 and 14 are partial longitudinal sections on the lines 12—12, 13—13 and 14—14 of the Fig. 10, but to a larger scale;

Fig. 15 is a section analogous to that of Fig. 12 of another modification;

Fig. 16 is a view in elevation with a partial section of a food can improved in accordance with the invention;

Fig. 17 is a horizontal section on the line 17—17 of the Fig. 16, the can being in its normal position to the left of the diameter $pq$ and to the right of this diameter, deformed by bi-lateral pressures applied at $p$ and $q$;

Fig. 18 is a partial view in elevation corresponding to Fig. 16;

Fig. 19 is a longitudinal, radial, section showing the locking of the lid on the body of the container, this section being to a larger scale than that of Fig. 16;

Fig. 20 is a partial front view of a modification;

Fig. 21 is a longitudinal, radial, section on line 21—21 in Fig. 20.

Figure 1:
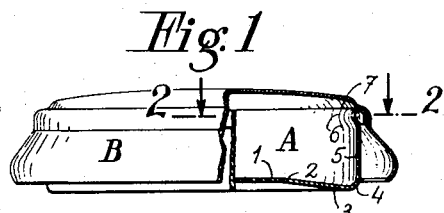
Fig. 1 is a view in elevation and partial section on the line 1—1 of Fig. 2 of a box in accordance with the invention.
Figure 2:
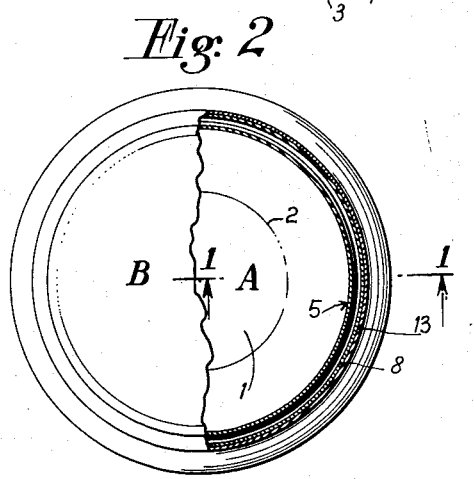
Fig. 2 is a plan view thereof with a partial section on the line 2—2 of Fig. 1.
Figure 3:
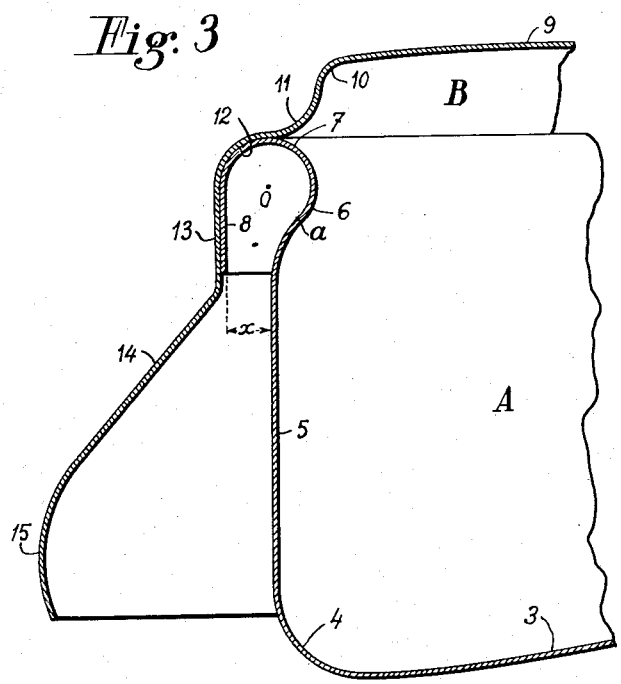
Fig. 3 is a partial radial section to a larger scale.

According to the embodiment shown in Figs. 1 to 3 the container, which constitutes a tin of polish, cream, beauty, or other product, comprises the combination of a body of a box A and a lid B. This box body A and this lid are both made of a material possessing a certain elasticity such as metal (tin-plate for instance), various synthetic materials, etc.

The box body A comprises a bottom 1, preferably slightly raised at 2 so as to form a circular strengthening band 3. This band is connected through a radiused portion 4 to a lateral cylindrical wall 5.

The cylindrical wall 5 is followed by a recessed bead 6, the section (Fig. 3) of which on a radial axial plane has a point of inflection at $a$. The recessed bead 6 is extended at 7 by a portion which is first outwardly turned and then flanged downwardly. This intermediate arcuate portion, which constitutes the upper rim of the box, is toric in shape, the section thereof on a radial axial plane being half a circumference with the centre at O.

The toric-shaped rim 7 is extended downwardly by a resilient circular depending portion 8. This depending portion has a diameter such that the internal face thereof is at a certain distance $x$ from the theoretical cylinder extending from the external face of the cylindrical wall 5 of the box body A and is consequently at a slightly greater distance from the outer face of the recessed bead 6.

The lid B possesses a top 9, preferably slightly convex. This top 9 is connected, by two curved portions 10 and 11 radiused in opposite directions, to a seating portion 12 that has a section in the form of quarter of a circumference and is adapted to fit exactly over the external surface of the upper rim 7 of the box body A.

The seating portion 12 is extended by the lateral wall of the lid. This wall is constituted, after this seating portion 12, by a cylindrical portion 13 the section of which on an axial radial plane is, in the example shown, longer than the depending portion 8 of the box body A.

The inside diameter of the cylindrical portion 13 exactly corresponds to the outside diameter of said depending portion 8. This cylindrical portion 13, which constitutes the seating or fitting part of the lid, is extended by a downwardly flared portion 14. This portion 14 has a conical or similar shape and is extended by a radiused portion 15 having the shape of part of a tore.

To give an example, for a box in which the body A and the lid B are made of tin-plate 0.25 and 0.20 mm. thick respectively and the cylindrical portion 5 of the body A has an outside diameter of 31.5 mm., the following dimensions may advantageously be used:

|  | Mm. approx. |
|---|---|
| Radius of the upper rim of the box A | 1 |
| Length of the depending portion 8 of the box body | 2 |
| Distance $x$ of the inner face of this depending portion 8 from the outer extended face of the cylindrical wall 5 | 1 |
| Length of the cylindrical seating part of the lid B | 2.5 |
| Radius of the large base of the conical portion 14 | 37 |

The mode of utilizing the container is simple. The body A being filled with polish, cream or other product up to or near the recessed bead 6, for instance up to the point $a$, is easy to close, because the downwardly flared extension 14 guides the lid the seating part 13 of which centers automatically on the toric rim 7 of the body A. It suffices to press on the lid to drive it onto this body to the position shown in Figs. 1 to 3, in which the radiused portion 12 bears against the outer portion of the upper rim 7 of the container.

In this closed position, the lid B is perfectly held by the elastic depending portion 8 of the box body A.

Under the action of a uni-lateral blow on the flared portion 14 due to the box falling, the depending portion 8 which is free on its inner side gives elastically in the region of the blow then resumes its original position driving before it the seating part of the lid, without this lid being actually lifted from the box body.

This may at first sight seem surprising since the opening of the box by a bi-lateral pressure is easier than in the known types of boxes hereinbefore mentioned, but it must be recalled that during the opening by bi-lateral pressure, an operation which will be hereinafter described, the fingers exert a continuous pressure on the box and the elastic depending portion cannot spring back to its original position.

To open the box, a bi-lateral pressure is exerted in the direction of arrows $P^1$ and $P^2$ (Fig. 4) by means of for instance two fingers, on the extension 14—15 of the lid. The corresponding parts of this extension yield considerably in a progressive way at $14^a$, for the depending portion 8 is able to give locally at $8^a$ owing to the clearance $x$ (Fig. 3) that exists in the normal position of the depending portion between said depending portion and the box body.

It may be observed that the elastic yielding of the depending portion 8 is all the easier because the lever arm constituted by the two portions of the extension 14 upon which the pressures $P^1$ and $P^2$ are applied, acts upon the free lower edge of this depending portion 8.

Briefly, with this deformation, it is possible with pressures $P^1$ and $P^2$ so light as to be exerted with two fingers in the case of the box having the aforementioned dimensions, to give to the lid B the deformation shown in Fig. 4 so that in the diametrical axial plane XX perpendicular to the plane of the figure, that is, perpendicular to the directions of the diametrical pressures $P^1$ and $P^2$, the seating 13 is completely lifted off the upper rim of the cylindrical depending portion 8 of the box body 4 to a height $y$, whereas in the region of the pressures $P^1$ and $P^2$ the seating is still in engagement with said depending portion.

Under these conditions, when the pressures $P^1$ and $P^2$ are released the fingers continuing to hold the lid horizontal, it is found that the box body A if not supported falls away from the lid B under the effect of its own weight and that of its contents and may be received by a support, for instance the other hand of the user, placed a little below the underside of the box.

Opening is very easy, for as the depending portion 8 yields elastically and in a very progressive manner, the deformation of the lid is itself progressive and a resistance requiring the exertion of too hard a force by the user is avoided.

It should be noted that the two local deflections at $14^a$ of the lid extension 14—15 are not restricted by any premature contact of the radiused portion 15 with the cylindrical portion 5 of the box body A, for, owing to the clearance $x$ between the wall 5 and the small diameter of the downwardly flared extension 14, the latter is further away from this wall 5 in the normal position of the box than it would be in the case of a lid fitting directly on the wall 5 of the box body.

In the region of the applied pressure the generatrice of the extension 14 may practically, if necessary, take up a position parallel to the centre line of the box.

There should be mentioned another very important advantage of the construction in accordance with the invention that arises from the fact that the boxes to which the invention applies are generally varnished or painted on their outer faces, whereas the inner faces of the box body A and the lid B are generally unvarnished (notably the case with tin-plate boxes).

In the usual type of box the lid fits against the outer face of the box which is varnished and opening is made more difficult due to the sticking effect of the varnish. In the box in accordance with the invention, however, the inner face of the seating 13, which is unvarnished, mates with the outer face of the depending portion 8. Now, this outer face being a continuation of the inner face of the cylindrical wall 5 of the box body is also unvarnished. Thus the faces of the box body A and the lid B are in metal to metal contact and run no risk of being more or less stuck together by the presence of varnish.

Another aspect of this feature is that during the filling of the box the recessed bead 6 of the box body A prevents the product poured in (wax, cream, etc.) from soiling if not the rim 7 of the box at least the outer depending portion 8 and ensures that no sticking of the lid to the body occurs due to the presence of the product.

If during storage or use this product gives off more or less corrosive fumes, the latter will first attack the surfaces 7 and 12 of the box body and the inner surface of the lid, and the seating or fitting faces 8 and 13 will remain unaffected.

For these reasons, the relative sliding of the fitted surfaces during the opening of the box is not checked and opening is easy.

Further, the radiused portion 15, or alternatively, a cylindrical rim, enables the pressures $P^1$ and $P^2$ to be applied without harm to the hands or fingers which would occur if the more or less sharp edge of the conical surface 14 were not terminated by such a radiused portion. This portion 15 moreover sufficiently strengthens the conical portion 14 of the lid to prevent, during the application of pressures $P^1$ and $P^2$, purely local and useless deformations of said conical portion.

The manufacture of the described box presents no difficulty. The lid B is pressed out and a radius applied to its edge. The box body A is made in three stages:

A drawing operation gives the blank the radial section shown in Fig. 5.

Then the recessed bead 6 and the inner part of the rim 7 is formed by means of a pair of rotative complementary rollers 16 and 17 the centres of which are parallel to the centre line of the box.

Lastly, the outer part of this rim 7 and the depending portion 8 are formed by means of a punch and die 18 and 19 of revolution about the center line of the box. It will be noticed that as the depending portion 8 is a distance $x$ from the wall of the box body, the tool 18 is able to penetrate between the depending portion and this box body, and in this way to co-operate with the tool 19 to wipe down and iron out without the slightest deformation of the box body a perfectly cylindrical wrinkle-free depending portion.

The axial length of fitting or seating of the cylindrical portion 13 of the lid B over the depending portion 8 of the box body A is not particularly important. It is necessary, however, that it be sufficient to ensure that the lid does not open too rapidly, the opening becoming, of course, more difficult with increase in the length of fitting.

The means as a result of which the lid may be removed from the container only upon the exertion of two bi-lateral pressures applied successively on the lid along two diameters substantially at right angles to each other, may consist as shown in Fig. 3 in a substantial extension of cylindrical part 13 of the lid beyond and below the lower edge of the extension 8 of rim 7 of the container, as shown more specifically in Fig. 3.

According to the modification shown in Figs. 8 to 14, the box body $A^1$, which includes a bottom 21, preferably slightly raised at 22 so as to form a peripheral strengthening band connected by a radiused portion 24 to a lateral cylindrical wall 25, is provided with a very small recess 26 forming an inner bead which is extended by a portion 27 directed first outwardly than downwardly more or less in the shape of part of a tore and which in turn is extended by a depending portion 28 which is downwardly flared and has a substantially conical shape. The half-angle at the top may advantageously be between 12 and 18°.

This depending portion may again be very easily obtained in the way hereinbefore described with the aid of two annular tools coaxial with the centre line XX (Fig. 8) of the box and lid. The half angle at the top of the mating surfaces of the two tools may be 10–16° to obtain a depending portion making an angle of 12–18° with the cylindrical wall 25, for, due to the elasticity of the metal, this angle at the top of the depending portion tends to increase after tooling.

The lid $B^1$ possesses a top 29, preferably slightly convex. This top 29 is connected by two portions 30 and 31 radiused in opposite directions, to a seating portion 32 adapted to fit over the outer face of the top rim 27 of the box body $A^1$.

The seating portion 32 is extended by the lateral wall of the lid. This wall is formed of a cylindrical portion 33 having a section on the axial radial plane in the illustrated example which is longer than the depending portion 28 of the box body $A^1$.

The cylindrical portion 33 has an inside radius of $r^3$ (Fig. 14) which is substantially equal to that of the small base of the conical depending portion 28 and is in any case less than the radius $r^2$ of the large base of the depending portion.

The cylindrical portion 33, which constitutes the seating part of the lid is extended by a flared portion 34. This portion 34 of conical or like form is extended by a radiused portion 35 that is shaped like a portion of a tore.

To give an example, for a box the body $A^1$ and the lid $B^1$ of which are made of tin plate 0.25 and 0.20 mm. thick respectively, the following dimensions may advantageously be employed:

|  | Mm. approx. |
|---|---|
| Outside radius $r^1$ (Fig. 7) of the body 25 | 31.5 |
| Radius $r^2$ of the lower outer edge of the depending portion 28 | 33.2 |
| Inside radius $r^3$ of the cylindrical portion 33 of the lid $B^1$ | 32.75 |
| Radius of the bead constituting the top rim 27 and the bead portion 26 of the box body $A^1$ | 0.5 |
| Length of the depending portion 28 | 3.2 |
| Length of the cylindrical portion 33 of the lid $B^1$ | 4.5 |
| Maximum outside radius $r^4$ of the extended flared portion of the lid | 37 |

The mode of utilizing the containers is simple. The body $A^1$ filled to within the region of the bead 26, is closed as in the first example and just as easily. The juncture 36 between portions 33 and 34 (Fig. 14) of the lid $B^1$ forms a line which is applied at $m$ to the whole of the periphery of the flared depending portion 28. It suffices to press on the lid $B^1$ to drive it home onto the body A, to the position shown in Figs. 9 and 12 in which the radiused portion 32 bears against the outside of the top rim 27 of the body $A^1$.

In this closed position, the lid $B^1$ is perfectly held by the elastic depending portion 28 of the box body $A^1$, for this depending portion undergoes an elastic deflection and therefore assumes the cylindrical form $28^a$ in the Fig. 12. This elastic deflection is easily proved, for the cylindrical portion 33 of the lid remains cylindrical and, moreover, after numerous openings of the box it is found that the angle at the top of the depending portion 28 decreases slightly as a consequence of a slight permanent deformation between the conical shape 28 of Fig. 14 and the cylindrical shape of Fig. 12.

Subjected to a uni-lateral blow, the box behaves as that of the first example.

To open the box, a bi-lateral pressure is applied in the direction of arrows $P^1$ and $P^2$ (Figs. 10, 11, 13) by means of for instance two fingers on the extension 34 of the lid and the corresponding portions of this extension deflect considerably and in a progressive way at $34^b$ (Figures 11, 13) for, because of the clearance between the depending portion 28 and the box body $A^1$, said depending portion is able to yield locally.

With such a deformation, it is possible to give the lid $B^1$ the deformation shown in the upper part of the Fig. 10 and in Figs. 11 and 13, so that in the diametrical axial plane Y—Y (Fig. 10) perpendicular to the direction of the diametrical pressures $P^1$ and $P^2$, the seating 33 is disengaged and assumes the position in Fig. 14 with the point of contact resting at $m$ on the depending portion 28, whilst in the region of the applied pressure $P^1$ and $P^2$ the seating 33 is still engaged at $33^b$ under the depending portion locally deformed to $28^b$ (Fig. 13).

It suffices then to exert a slight new bi-lateral pressure on the lid in the direction of the plane Y—Y of Fig. 10 to cause the box body $A^1$ if it is not supported, to fall away under the effect of its own weight and the weight of the contents and be received by a support, for instance the other hand of the user, placed a small distance under the box.

During the application of the second pressures in the plane Y—Y, the user will hear a slight click produced by the return of the portion of the depending portion 28 previously deformed to 28ᵇ (Fig. 13) to the normal position. This noise informs the user that the box is open, if by chance his second hand is held too close to the base of the box and prevents him from realizing that the box body A¹ is freed from the cover B¹.

In Fig. 15 is illustrated a further modification in which the portion 33ᵈ of the lid B² instead of being cylindrical as in the two previous examples, is itself slightly conical and downwardly flared. In this embodiment the depending portion of the box body A² undergoes less deformation in passing from the normal free state (analogous to that shown for the second example in Fig. 14) to that of complete assembly shown in Fig. 15.

Here again the embodiments illustrated in Figs. 8 to 14 and in Fig. 15 the opening of the box by means of two successive bi-lateral pressures applied on the lid at substantially right angles to each other, as described heretofore with respect more particularly of Figs. 10 to 13, can be obtained by extending the cylindrical portion of the lid 33 as shown in Fig. 12 or 33ᵈ as shown in Fig. 15 for a distance below the lower rim of the cooperating dependent portion 28 of the container as shown in these figures.

Figs. 16 to 19 relate to a box of larger size for containing preserved food for example. The wall 5 of the box body A³ comprises a cylindrical depending portion 8 which co-operates with the cylindrical portion 13ᶜ of the lid B³. A sealing ring 36 in rubber or similar substance is lodged against the seating surface at the bottom of the lid so as to ensure an air-tight joint between the body of the container and the lid.

As this ring has to be compressed to a certain extent to ensure an air-tight sealing, said ring tends to eject elastically the lid. This is prevented by two diametrically opposite projections 37 carried by the lid at the base of its cylindrical seating portion, which engage under the free edge of the depending portion 8, as is clearly shown in Fig. 19.

These projections 37 are formed by two diametrically opposite louver-like indentations pierced and formed at the base of the cylindrical seating of the lid at the commencement of its flared extension.

To open the box, two diametrically opposite pushes at p and q (Fig. 17) must be applied to increase the diameter of the lid in the plane passing through the two internal projections 37 and thereby allow the latter to pass by the depending portion 8. A second bi-lateral pressure in the region of the projections completely frees the lid.

A further modification has been illustrated in Figs. 20 and 21, in which the two projections of the last described modification are replaced by two diametrically opposite inwardly protruding indentations or swages 38.

It will be seen that in the embodiments of Figs. 16 to 19 and of Figs. 20 and 21, the complete release of the lid from the container will require the successive application of two bi-lateral pressures, the first to disengage the projections 37 (Fig. 16) from the depending portion 8 or to disengage in substantially similar manner the indentations 38 (Figs. 20 and 21), followed by a second bi-lateral pressure on the lid.

The invention is not limited to the precise details of construction herein described with reference to the drawing, and modifications and changes may be made without departing from the scope of the invention.

Having now described my invention what I claim as new and desire to secure by Letters Patent is:

1. An article of manufacture comprising: a container including a bottom wall, a circular side wall, a resilient circular depending portion surrounding the upper part of said side wall substantially concentric to said side wall and spaced therefrom, and an intermediate arcuate portion connecting the top of said depending portion with the top of said side wall; a closure adapted to fit onto said container; said closure including a top wall, a downwardly and outwardly curved portion depending from said top wall and adapted to fit closely onto said arcuate portion, and a lateral wall prolonging said curved portion downwardly; said lateral wall comprising an upper cylindrical portion the internal diameter of which is such that said cylindrical portion fits onto and around said resilient depending portion with a slight and resilient deformation of said depending portion, and a lower resilient lever portion prolonging downward said upper cylindrical portion and forming a substantially frusto-conical circular portion flaring outwardly and downward; said lateral wall being constructed and adapted to engage the bottom edge of said resilient depending portion whereby said closure can be removed from said container only by the external application to said lever portion of two successive bilateral pressures directed inwardly along two substantially perpendicular diameters of the container.

2. An article of manufacture comprising: a container including a bottom wall, a circular side wall, a resilient depending portion surrounding the upper part of said side wall substantially concentric to said side wall spaced therefrom, and an intermediate arcuate portion connecting the top of said depending portion with the top of said side wall; a closure adapted to fit onto said container; said closure including a top wall, a downwardly and outwardly curved portion depending from said top wall and adapted to fit closely onto said arcuate portion, and a lateral wall prolonging said curved portion downwardly; said lateral wall comprising an upper cylindrical portion the internal diameter of which is such that said cylindrical portion fits onto and around said resilient depending portion with a slight and resilient deformation of said depending portion, the lateral height of said cylindrical portion being greater than the lateral height of said depending portion, said cylindrical portion extending a substantial distance below the bottom edge of said depending portion when said arcuate portion and said curved portion are applied onto each other; said lateral wall comprising further a lower resilient lever portion prolonging said upper cylindrical portion downward and forming a substantially frusto-conical circular portion flaring outwardly and downward; whereby upon the application onto said lower lever portion of an external bilateral pressure directed inwardly and along a first diametral plane, said upper portion engages the lower edge of said depending portion at two points located in said first diametral plane, thereby locking said closure on said container, said upper portion being then sufficiently disengaged from said depending portion along a second diametral plane perpendicular to said first diametral plane to permit separation of said closure from said container upon application onto said lower lever portion of a second inwardly directed bilateral pressure along said second diametral plane.

3. An article as claimed in claim 2, in which said depending portion is substantially cylindrical, and has a height equal substantially to four-fifths of the height of said upper cylindrical portion of said lateral wall of said closure.

4. An article of manufacture comprising: a container including a bottom wall, a circular side wall, a resilient circular depending portion surrounding the upper part of said side wall substantially concentric to said side wall and spaced therefrom, and an intermediate arcuate portion connecting the top of said depending portion with the top of said side wall; a closure adapted to fit onto said container; said closure including a top wall, a downwardly and outwardly curved portion attached to the periphery of said top wall and adapted and constructed to fit closely onto said arcuate portion, and a lateral wall prolonging said curved portion downwardly; said lateral wall comprising an upper cylindrical portion having an internal diameter such that said upper portion fits onto and around said resilient depending portion with a slight and elastic deformation of said depending portion, the height of said upper portion being at least equal to the height of said depending portion whereby said upper portion contacts the lower edge of said depending portion when said closure is in the position of closing on the container; said lateral wall further comprising a lower resilient lever portion prolonging said upper cylindrical portion downward and forming a substantially frusto-conical circular portion flaring outwardly and downward, and substantially at the junction line between said upper and lower portions two diametrically opposed, inwardly directed projections engaging under said lower edge of said depending portion and adapted to lock the closure on the container; whereby the closure can be separated from the container only by the application of two successive bilateral external pressures, directed inwardly, the first pressure being applied along a diameter perpendicular to the diameter on which said projections are located to disengage said projections from said lower edge, and the second pressure being applied along the last named diameter to disengage the closure from said depending portion.

5. An article as claimed in claim 4, further comprising a sealing ring disposed against the inner face of said curve portion of said closure and adapted to bear resiliently onto said arcuate portion, thereby causing a resilient locking of the closure on the container by the engagement of said projections under said lower edge.

References Cited in the file of this patent

UNITED STATES PATENTS

| | | |
|---|---|---|
| 1,354,914 | Nowack | Oct. 5, 1920 |
| 1,418,090 | Matter | May 30, 1922 |
| 1,693,150 | Malonyay | Nov. 27, 1928 |
| 1,807,417 | Lechner | May 26, 1931 |
| 2,060,504 | Kjellstrom | Nov. 10, 1936 |
| 2,350,950 | Wiley | June 6, 1944 |
| 2,510,824 | Lafarge | June 6, 1950 |